(12) United States Patent
Tsai et al.

(10) Patent No.: US 10,423,054 B2
(45) Date of Patent: Sep. 24, 2019

(54) WAVELENGTH CONVERSION STRUCTURE AND PROJECTION DEVICE

(71) Applicant: Coretronic Corporation, Hsin-Chu (TW)

(72) Inventors: Chia-Lun Tsai, Hsin-Chu (TW); Yu-An Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 267 days.

(21) Appl. No.: 15/461,489

(22) Filed: Mar. 17, 2017

(65) Prior Publication Data

US 2017/0269464 A1 Sep. 21, 2017

(30) Foreign Application Priority Data

Mar. 18, 2016 (CN) .......................... 2016 1 0156754

(51) Int. Cl.
*G03B 21/20* (2006.01)
*G02B 26/00* (2006.01)
(Continued)

(52) U.S. Cl.
CPC ......... *G03B 21/204* (2013.01); *G02B 5/0284* (2013.01); *G02B 26/008* (2013.01); *G03B 21/16* (2013.01); *G03B 33/08* (2013.01)

(58) Field of Classification Search
None
See application file for complete search history.

(56) References Cited

U.S. PATENT DOCUMENTS

| 2013/0242534 A1* | 9/2013 | Pettitt | G03B 21/204 |
|---|---|---|---|
| | | | 362/84 |
| 2013/0334553 A1 | 12/2013 | Yeh et al. | |

(Continued)

FOREIGN PATENT DOCUMENTS

| CN | 102650814 | 8/2012 |
|---|---|---|
| CN | 101936505 | 3/2013 |

(Continued)

OTHER PUBLICATIONS

"Office Action of China Counterpart Application," dated Apr. 28, 2019, p. 1-p. 11.

*Primary Examiner* — Britt D Hanley
(74) *Attorney, Agent, or Firm* — JCIPRNET

(57) ABSTRACT

A wavelength conversion structure and a projection device are provided. The wavelength conversion structure is disposed on a transmission path of an illumination light beam emitted by a light source of the projection device, and includes a rotary disc, a wavelength conversion material, and a scattering-reflective material. The rotary disc has a light-conversion region and a non-light-conversion region. The light-conversion region surrounds the non-light-conversion region. The wavelength conversion material is disposed on the rotary disc, and is aligned to the light-conversion region. An energy gap of the wavelength conversion material is smaller than photon energy of the illumination light beam. The scattering-reflective material is disposed on the rotary disc, and is aligned to the light-conversion region and not aligned to the non-light-conversion region. An energy gap of the scattering-reflective material is larger than the photon energy of the illumination light beam.

15 Claims, 13 Drawing Sheets

(51) Int. Cl.
    *G02B 5/02*     (2006.01)
    *G03B 21/16*     (2006.01)
    *G03B 33/08*     (2006.01)

(56) References Cited

U.S. PATENT DOCUMENTS

| | | | |
|---|---|---|---|
| 2015/0098070 A1* | 4/2015 | Hsieh | G02F 1/353 355/67 |
| 2015/0116982 A1* | 4/2015 | Jao | G03B 21/2093 362/84 |
| 2015/0362830 A1* | 12/2015 | Liao | G03B 21/204 353/31 |
| 2016/0252722 A1* | 9/2016 | Li | G02B 26/008 362/84 |

FOREIGN PATENT DOCUMENTS

| | | |
|---|---|---|
| CN | 103715344 | 4/2014 |
| CN | 103968332 | 8/2014 |
| CN | 203932671 | 11/2014 |
| CN | 104516180 | 4/2015 |
| CN | 104566230 | 4/2015 |
| CN | 104597698 | 5/2015 |
| CN | 104713035 | 6/2015 |
| CN | 104865670 | 8/2015 |
| JP | 2013061525 | 4/2013 |
| TW | 201435469 | 9/2014 |
| TW | 201518843 | 5/2015 |
| TW | 201523115 | 6/2015 |
| TW | 201546495 | 12/2015 |

\* cited by examiner

WAVELENGTH CONVERSION STRUCTURE AND PROJECTION DEVICE

CROSS-REFERENCE TO RELATED APPLICATION

This application claims the priority benefit of China application serial no. 201610156754.5, filed on Mar. 18, 2016. The entirety of the above-mentioned patent application is hereby incorporated by reference herein and made a part of this specification.

BACKGROUND OF THE INVENTION

Field of the Invention

The invention relates to a wavelength conversion structure and a projection device.

Description of Related Art

Projector is a display device used for producing large-size images, and an imaging principle thereof is to convert an illumination light beam provided by a light source into an image light beam by using a light valve, and then project the image light beam onto a screen to form an image through a lens. Projector plays a very important role in information transmission, so that it is widely applied in many fields. A user uses a projector in collaboration with a projection screen to present figures or images according to content of image information provided by an image source.

Generally speaking, the projector uses a laser light beam emitted by a laser diode to excite phosphor in a phosphor wheel, and the phosphor is excited to provide an excitation light beam of different colors. Conventionally, a colloid having a white porous ceramic material is coated on the phosphor wheel, and then a fluorescent colloid is coated on the white porous ceramic material. However, such phosphor wheel has following problems. The amount of the colloid having the white porous ceramic material determines reliability and light-emitting efficiency of the phosphor wheel. If a proportion of the white porous ceramic material in the colloid having the white porous ceramic material is lower (a proportion of the colloid is higher), a scattering or reflecting effect thereof is poor; comparatively, if the proportion of the white porous ceramic material in the colloid having the white porous ceramic material is higher (a proportion of the colloid is lower), adhesiveness of the colloid having the white porous ceramic material adhered to the phosphor wheel is poor. Moreover, since the colloid having the white porous ceramic material is exposed in environmental media such as air, etc., when the phosphor wheel is rotated, the white porous ceramic material is liable to fall on a lens of the projector, which not only influences the light-emitting efficiency and reliability of the phosphor wheel itself, but also decreases light-emitting efficiency and reliability of the projector and quality of the image projected by the projector.

Moreover, since a large amount of heat energy is produced when the high-energy laser light beam continuously irradiates the phosphor wheel, the phosphor in the phosphor wheel has a thermal quenching phenomenon, i.e. a phenomenon that the light-conversion capability of the phosphor wheel is greatly decreased along with increase of temperature. Therefore, to resolve the aforementioned problem becomes an important issue studied and researched by related technicians of the field.

The info nation disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a wavelength conversion structure, and the wavelength conversion structure has good light-emitting efficiency and reliability.

The invention is directed to a projection device, and the projection device has the aforementioned wavelength conversion structure and has good light-emitting efficiency and reliability.

Other objects and advantages of the invention can be further illustrated by the technical features broadly embodied and described as follows.

In order to achieve one or a portion of or all of the objects or other objects, an embodiment of the invention provides a wavelength conversion structure, and the wavelength conversion structure is adapted to be disposed on a transmission path of an illumination light beam emitted by a light source of a projection device. The wavelength conversion structure includes a rotary disc, a wavelength conversion material, and a scattering-reflective material. The rotary disc has a light-conversion region and a non-light conversion region. The light-conversion region surrounds the non-light-conversion region. The wavelength conversion material is disposed on the rotary disc, and is aligned to the light-conversion region. An energy gap of the wavelength conversion material is smaller than photon energy of the illumination light beam. The scattering-reflective material is disposed on the rotary disc, and is aligned to the light-conversion region, and is not aligned to the non-light-conversion region. An energy gap of the scattering-reflective material is larger than the photon energy of the illumination light beam.

In order to achieve one or a portion of or all of the objects or other objects, an embodiment of the invention provides a projection device including an illumination system, a light valve, and an imaging system. The illumination system includes a light source and the aforementioned wavelength conversion structure. The light source is adapted to provide an illumination light beam. The aforementioned wavelength conversion structure is disposed on a transmission path of the illumination light beam emitted by the light source. The light valve is adapted to convert a converted light beam from the wavelength conversion structure into an image light beam. The imaging system is disposed on a transmission path of the image light beam.

According to the above descriptions, the embodiments of the invention have at least one of following advantages or effects. The wavelength conversion material and the scattering-reflective material in the wavelength conversion structure of the embodiment of the invention are all aligned to the light-conversion region, and the scattering-reflective material is not aligned to the non-light-conversion region, so that a chance/probability that the scattering-reflective material is exposed to environmental media (for example, air) is low, which greatly mitigates falling/dropping/peeling/splitting of the scattering-reflective material. Therefore, the wavelength conversion structure of the embodiment of the invention has good light-emitting efficiency and reliability. Further, since the projection device of the embodiment of the invention includes the aforementioned wavelength conversion structure, the projection device of the embodiment of the invention may greatly avoid dropping/splitting/falling/ peeling of the scattering-reflective material to influence other components (for example, a projection lens) in the projection device, so that the projection device of the embodiment of the invention has good light-emitting efficiency and reliability, and quality of the projected image thereof is good.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1A:
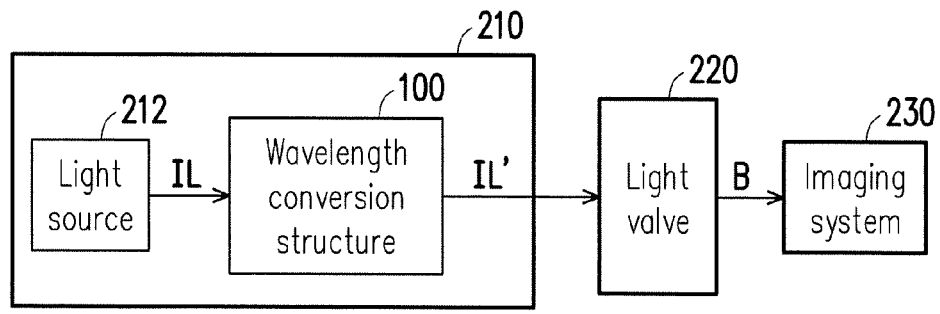
FIG. 1A and FIG. 1B are block diagrams of a projection device according to different embodiments of the invention.
Figure 1B:
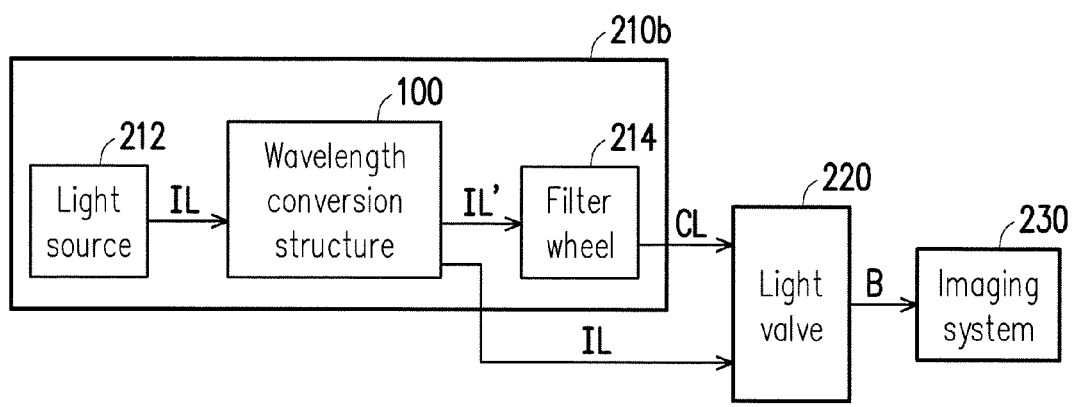

FIG. 1A and FIG. 1B are block diagrams of a projection device according to different embodiments of the invention.

Referring to FIG. 1A, the projection device 200a of the embodiment includes an illumination system 210, a light valve 220, and an imaging system 230. To be specific, the illumination system 210 includes a light source 212 and a wavelength conversion structure 100. The light source 212 of the illumination system 210 is adapted to provide an illumination light beam IL. The wavelength conversion structure 100 is disposed on a transmission path of the illumination light beam IL emitted by the light source 212. The light valve 220 is disposed on a path of a converted light beam IL' coming from the wavelength conversion structure 100, and is adapted to convert the converted light beam IL' coming from the wavelength conversion structure 100 into an image light beam B.

In the embodiment, the wavelength conversion structure 100 is configured for sequentially converting the illumination light beam IL emitted by the light source 212 into the converted light beam IL' of different colors (for example, red, green, yellow), though the invention is not limited thereto. For example, the converted light beam IL' may include a part of the illumination light beam IL, and the part of illumination light beam IL is, for example, a blue light, which may be converted by an optical assembly having a scattering function for combining with lights of different colors to form the converted light beam IL', however the above content is determined according to an actual design requirement of related technicians. Then, in the embodiment, the light valve 220 may convert the converted light beam IL' of different colors sequentially coming from the wavelength conversion structure 100 into the image light beam B, and the imaging system 230 sequentially projects the image light beam B to produce images on a screen.

To be specific, in the embodiment, the light source 212 is, for example, a laser diode or a light-emitting diode, and the light source 212 is, for example, configured for emitting a blue light, a purple light or a light with other short wavelength(s), which is not limited by the invention. The wavelengths conversion structure 100 is, for example, a phosphor wheel, though the invention is not limited thereto. The light valve 220 is, for example, a digital micro-mirror device (DMD), a liquid-crystal-on silicon panel (LCOS panel) or liquid crystal display (LCD) panel, though the invention is not limited thereto. The imaging system 230 is, for example, a projection lens, though the invention is not limited thereto.

It should be noted that the element names of the aforementioned embodiment are adopted in the following embodiments, in which the same element names denote the same or like components, and descriptions of the same technical contents are omitted. The aforementioned embodiment may be referred for descriptions of the omitted part, and details thereof are not repeated.

Referring to FIG. 1B, the projection device 200b of FIG. 1B is substantially similar to the projection device 200a of FIG. 1A, and a main difference therebetween is that the projection device 200b of FIG. 1B further includes a filter wheel 214. To be specific, in the embodiment, the illumination system 210b of the projection device 200b includes the filter wheel 214, and the filter wheel 214 is disposed on the transmission path of the converted light beam IL' coming from the wavelength conversion structure 100. In the embodiment, the filter wheel 214 is configured for filtering lights, such that at least one color light beam CL is filtered through the converted light beam IL' coming from the wavelength conversion structure 100. In detail, the filter wheel 214, for example, includes at least one filter element (for example, a color filter), which may be adapted to selectively filter different wavebands of light. To be specific, in the embodiment, the filter wheel 214 is disposed between the wavelength conversion structure 100 and the light valve 220, and the light valve 220 is disposed on a transmission path of the at least one color light beam CL coming from the filter wheel 214. In the embodiment, the light valve 220 is adapted to convert the at least one color light beam CL coming from the filter wheel 214 into the image light beam B. The imaging system 230 is disposed on a transmission path of the image light beam B. In the embodiment, the light valve 220 sequentially converts the at least one color light beam CL of different colors or a part of the illumination light beam IL (for example, the part of the illumination light beam IL directly coming from the wavelength conversion structure 100) into the image light beam B of different colors, and then the imaging system 230 projects the image light beam B of different colors.

In the following description, the wavelength conversion structure 100 of the projection devices 200a and 200b of the aforementioned embodiment is described in detail below.

Figure 2A:
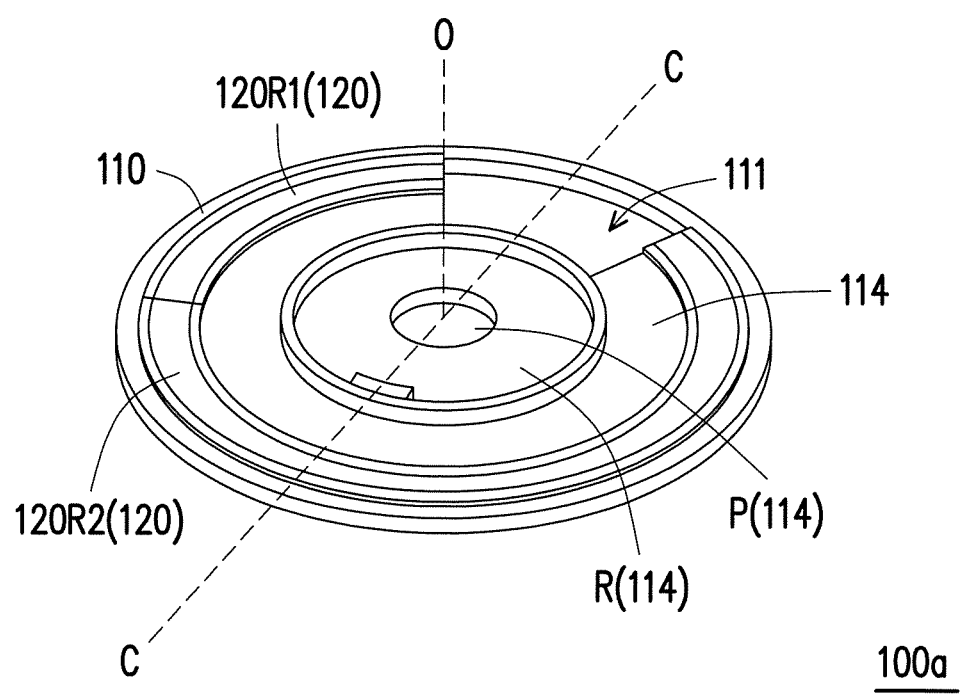
FIG. 2A is a structural diagram of a wavelength conversion structure according to an embodiment of the invention.
Figure 2B:
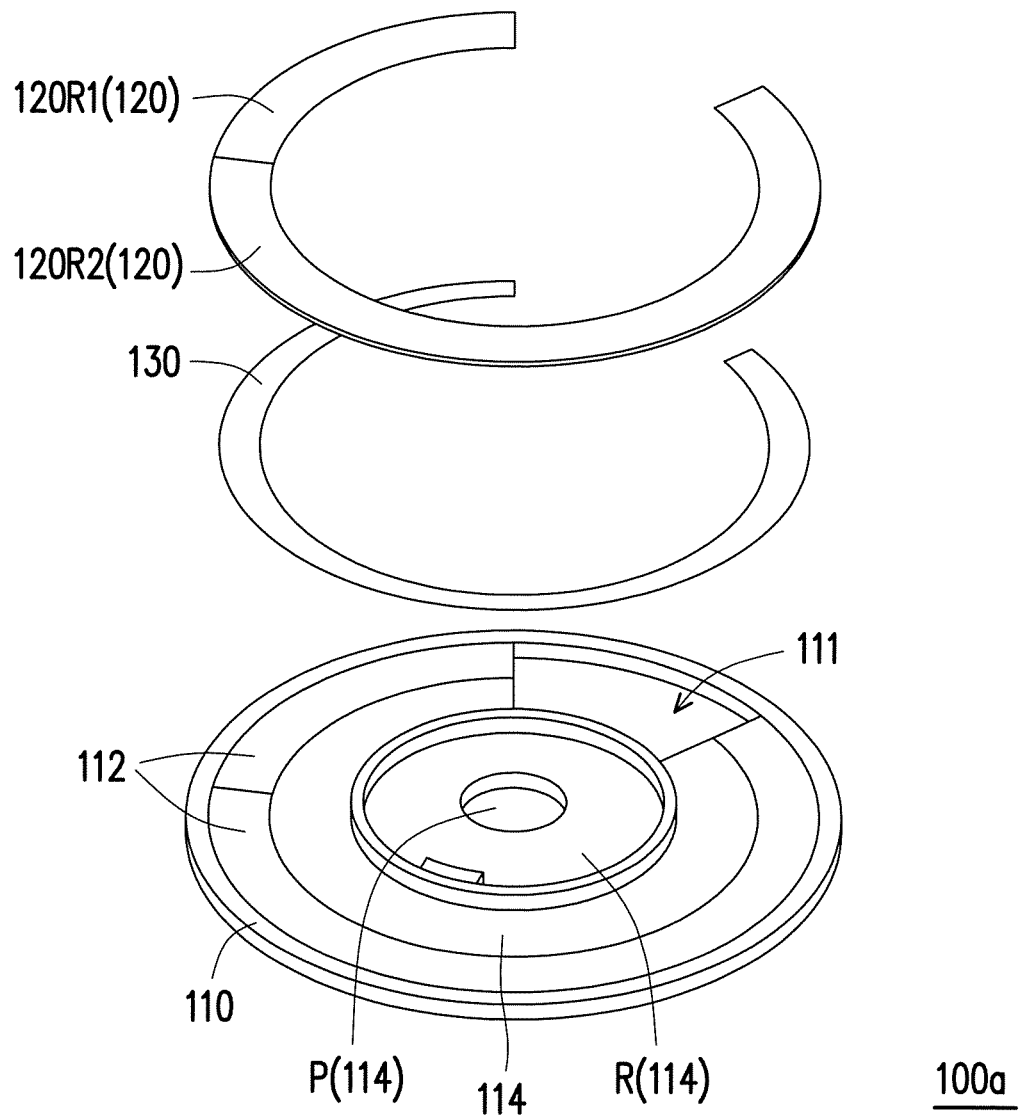
FIG. 2B is an exploded view of the wavelength conversion structure of FIG. 2A.
Figure 2C:
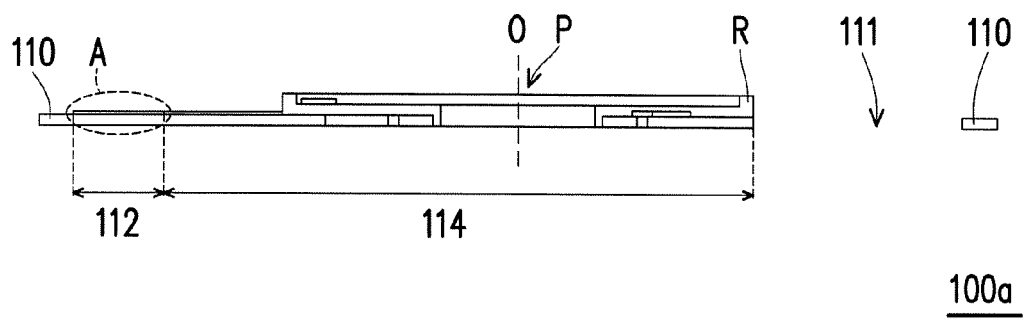
FIG. 2C is a cross-sectional view of the wavelength conversion structure of FIG. 2A along a section line C-C.
Figure 2D:
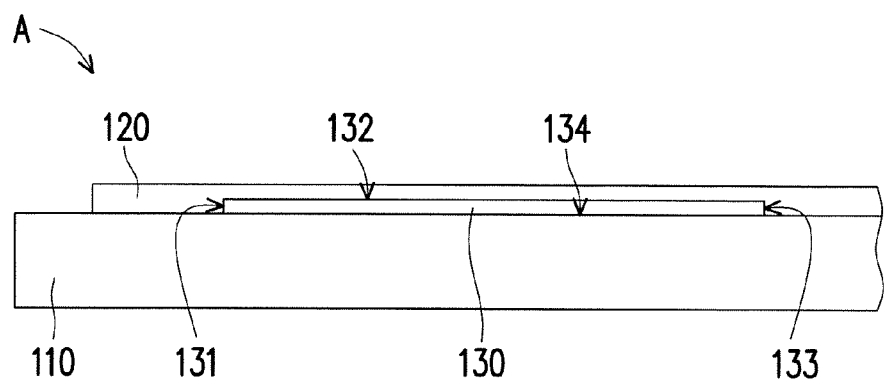
FIG. 2D is an enlarged cross-sectional view of a region A in FIG. 2C.

FIG. 2A is a structural diagram of a wavelength conversion structure according to an embodiment of the invention. FIG. 2B is an exploded view of the wavelength conversion structure of FIG. 2A. FIG. 2C is a cross-sectional view of the wavelength conversion structure of FIG. 2A along a section line C-C. FIG. 2D is an enlarged cross-sectional view of a region A in FIG. 2C.

Referring to FIG. 2A, FIG. 2B, FIG. 2C and FIG. 2D, the wavelength conversion structure 100 in the projection devices 200a and 200b of the aforementioned embodiment is, for example, the wavelength conversion structure 100a shown in FIG. 2A to FIG. 2D. In the embodiment, the wavelength conversion structure 100a includes a rotary disc 110, a wavelength conversion material 120, and a scattering-reflective material 130. The rotary disc 110 has a light-conversion region 112 and a non-light-conversion region 114. The light-conversion region 112 surrounds the non-light-conversion region 114. The wavelength conversion material 120 is disposed on the rotary disc 110, and is aligned to the light-conversion region 112, wherein an energy gap of the wavelength conversion material 120 is smaller than photon energy of the illumination light beam IL. The scattering-reflective material 130 is disposed on the rotary disc 110, and is aligned to the light-conversion region 112, and is not aligned to the non-light-conversion region 114, wherein an energy gap of the scattering-reflective material 130 is larger than the photon energy of the illumination light beam IL. To be specific, in the embodiment, the scattering-reflective material 130 is disposed/sandwiched between the rotary disc 110 and the wavelength conversion material 120.

In the embodiment, a material of the rotary disc 110 is, for example, metal, a high temperature resistant material, an adhesive material with a good adhesion property or a material with high thermal conductivity. To be specific, the metal material configured for manufacturing the rotary disc 110 is, for example, aluminium alloy, metal, metal alloy. The high temperature resistant material configured for manufacturing the rotary disc 110 is, for example, aluminium alloy, glass, aluminium oxide, aluminium nitride, ceramics, metal alloy. The adhesive material with a good adhesion property configured for manufacturing the rotary disc 110 is, for example, silica gel, epoxy resin, inorganic adhesive. The material with high thermal conductivity configured for manufacturing the rotary disc 110 is, for example, aluminium alloy, graphite, glass fiber, fiber glass, metal alloy. However, the aforementioned materials are only examples, and the material of the rotary disc is not limited by the invention.

In the embodiment, since the rotary disc 110 is made of a metal material or a material with high thermal conductivity, the heat dissipation capability of the wavelength conversion structure 100a is greatly improved, such that the light-emitting efficiency and reliability of the wavelength conversion structure 100a are improved. Moreover, in the embodiment, since the rotary disc 110 is made of a high temperature resistant material, the wavelength conversion structure 100a under a high temperature may maintain a certain structural strength, such that the reliability of the wavelength conversion structures 100a is improved. Moreover, since the rotary disc 110 of the embodiment is made of an adhesive material with a good adhesion property, the adhesiveness between the rotary disc 110 and the wavelength conversion material 120/the scattering-reflective material 130 is greatly improved, by which the reliability of the wavelength conversion structures 100a is also improved.

In the embodiment, the wavelength conversion material 120 is, for example, a fluorescent layer. In other embodiments, the wavelength conversion material 120 is, for example, an optical clear adhesive (OCA) layer encapsulating quantum dots (QD) or other OCA layer encapsulating a material having wavelength conversion capability, though the invention is not limited thereto.

In the embodiment, the scattering-reflective material 130 is, for example, an OCA layer encapsulating oxide particles, metal alloy particles or a combination thereof. To be specific, a material of the oxide particles is, for example, $TiO_2$, $SiO_2$, $ZrO_2$, $BaSO_4$, and a material of the metal alloy particles is, for example, Ti/Al alloy, though the invention is not limited thereto.

In the embodiment, since the wavelength conversion material 120 and the scattering-reflective material 130 are all aligned to the light-conversion region 112, and the scattering-reflective material 130 is not aligned to the non-light-conversion region 114, a chance/probability that the scattering-reflective material 130 is exposed in environmental media (for example, air) is extremely low, which greatly mitigate a situation that the scattering-reflective material 130 splits and drops when the wavelength conversion structure 100a rotates. Therefore, the wavelength conversion structure 100a of the embodiment has good light-emitting efficiency and reliability. Further, since the projection devices 200a and 200b of the embodiment include the aforementioned wavelength conversion structure 100a, the projection devices 200a and 200b of the embodiment may greatly avoid/mitigate the situation that the scattering-reflective material 130 falls on other components (for example, a projection lens) in the projection devices 200a and 200b, so that the projection devices 200a and 200b of the embodiment have good light-emitting efficiency and reliability, and quality of the projected image thereof is good.

Referring to FIG. 2D, in the embodiment, the wavelength conversion material 120 encapsulates the scattering-reflective material 130. To be specific, the scattering-reflective material 130 has a top surface 132, a bottom surface 134 opposite to the top surface 132, and two side surfaces 131 and 133 opposite to each other, wherein the two side surfaces 131 and 133 are respectively connected to the top surface 132 and the bottom surface 134. In detail, in the embodiment, the wavelength conversion material 120 is connected to the top surface 132 of the scattering-reflective material 130 and the two side surfaces 131 and 133 of the scattering-reflective material 130, and the bottom surface 134 of the scattering-reflective material 130 is connected to the rotary disc 110, and the wavelength conversion material 120 is also connected to the rotary disc 110. In the embodiment, the scattering-reflective material 130 is adhered to the rotary disc 110, and the wavelength conversion material 120 provides an additional adhesion force for the scattering-reflective material 130, such that the scattering-reflective material 130 is in a stable position. In this way, through the wavelength conversion material 120 encapsulating the two side surfaces 131 and 133 of the scattering-reflective material 130, the scattering-reflective material 130 is encapsulated between the wavelength conversion material 120 and the rotary disc 110, i.e. the scattering-reflective material 130 is encapsulated by the conversion material 120 and the rotary disc 110 together. Therefore, when the rotary disc 110 rotates quickly, the wavelength conversion material 120 may prevent splitting of the two side surfaces 131 and 133 of the scattering-reflective material 130. Therefore, the light-emitting efficiency and the reliability of the wavelength conversion structure 100a and the projection devices 200a and 200b of the embodiment may be further improved.

On the other hand, in the embodiment, the rotary disc 110 further has an opening 111, wherein the opening 111 and the light-conversion region 112 together surrounds the non-light-conversion region 114 through the opening 111 connecting to the light-conversion region 112. In this way, in the embodiment, when the illumination light beam IL coming from the light source 112 is transmitted to the wavelength conversion structure 100a, a part of the illumination light beam IL is transmitted to the wavelength conversion material 120 of the wavelength conversion structure 100a, and a part of the illumination light beam IL passes through the opening 111 to penetrate through the wavelength conversion structure 100a.

In the embodiment, the non-light-conversion region 114 of the rotary disc 110 includes a metal ring R, wherein the metal ring R is located at the center of the wavelength conversion structure 100a. In the embodiment, the metal ring R has a through hole P, and a rotation shaft O of the wavelength conversion structure 100a, for example, passes through the center of the through hole P. The wavelength conversion structure 100a is, for example, driven by a driving unit (not shown, for example, a motor), and wavelength conversion structure 100a driven by the driving unit is adapted to rotate the rotation shaft O, so as to drive the wavelength conversion material 120 to rotate. In this way, the illumination light beam IL is sequentially converted into the converted light beam IL' of different colors by the wavelength conversion structure 100a.

According to the above description, in the embodiment, since the energy gap of the wavelength conversion material 120 is smaller than photon energy of the illumination light beam IL, the wavelength conversion material 120 may be excited by the illumination light beam IL to convert the illumination light beam IL into the converted light beam IL' of different colors. Comparatively, since the energy gap of the scattering-reflective material 130 is larger than photon energy of the illumination light beam IL, the scattering-reflective material 130 is not excited by the illumination light beam IL. To be specific, the scattering-reflective material 130 is configured for scattering or reflecting the illumination light beam IL.

In the embodiment, the scattering-reflective material 130 is disposed/sandwiched between the rotary disc 110 and the wavelength conversion material 120, so that when the illumination light beam IL is transmitted to the wavelength conversion structure 100a, it is first transmitted to the wavelength conversion material 120. In the embodiment, the OCA in the wavelength conversion material 120 has a low refractive index, and the refractive index thereof is, for example, within a range between 1.3 and 1.6, such that most of the illumination light beam IL is transmitted in the wavelength conversion material 120. In this way, most of the illumination light beam IL may excite the wavelength conversion material 120, and the wavelength conversion material 120 converts the illumination light beam IL into the converted light beam IL' of different colors. Thereafter, the converted light beam IL' is emitted out from the wavelength conversion material 120, and is transmitted to the scattering-reflective material 130, and the scattering-reflective material 130 scatters or reflects the converted light beam IL', such that the converted light beam IL' is emitted out from the wavelength conversion structure 100a.

In detail, the wavelength conversion material 120 has at least one wavelength conversion region. In the embodiment, the wavelength conversion material 120, for example, includes two wavelength conversion regions 120R1 and 120R2. The wavelength conversion material 120 aligned to the wavelength conversion region 120R1 is, for example, a fluorescent (or phosphor) adhesive layer doped with green phosphor/fluorescence, and the wavelength conversion material 120 aligned to the wavelength conversion region 120R2 is, for example, a fluorescent (or phosphor) adhesive layer doped with yellow phosphor/fluorescence, though the invention is not limited thereto. In the embodiment, a part of the illumination light beam IL is transmitted to the wavelength conversion material 120 aligned to the wavelength conversion region 120R1, so that a part of the illumination light beam IL is converted into green converted light beam IL'. In the embodiment, a part of the illumination light beam IL is transmitted to the wavelength conversion material 120 aligned to the wavelength conversion region 120R2, so that a part of the illumination light beam IL is converted into yellow converted light beam IL'. The wavelength conversion structure 100a of the embodiment is, for example, applied to the projection device 200b of FIG. 1B. In the projection device 200b of FIG. 1B, the light source 212, for example, emits a blue light beam, and the illumination light beam IL passing through the opening 111 of the rotary disc 110 is, for example, the blue light beam, and the filter wheel 214, for example, includes a red color filter and a green color filter, etc., so that the green converted light beam IL' and at least a part of the yellow converted light beam IL' are filtered by the filter wheel 214 to form a red color light beam and a green color light beam (for example, the color light beam CL of FIG. 1B). In another embodiment, a transparent film or a transparent film having a scattering structure may be disposed on the filter wheel 214, such that the blue illumination light beam IL may pass there through. According to the above description, in the projection device 100a of the embodiment, by using the different wavelength conversion regions 120R1 and 120R2 on the wavelength conversion material 120 in collaboration with the filter wheel 214, the effect of three color light beams of red light beam, blue light beam, and green light beam is achieved through only two kinds of phosphors/fluorescence.

In an embodiment that is not shown, the wavelength conversion material 120, for example, has only a single wavelength conversion region, and the wavelength conversion material 120 aligned to this wavelength conversion region is a fluorescent (or phosphor) layer doped with yellow phosphor/fluorescence, though the invention is not limited thereto. In the embodiment, a part of the illumination light beam IL is transmitted to the wavelength conversion material 120 aligned to the wavelength conversion region, so that a part of the illumination light beam IL is converted into yellow converted light beam IL'. The wavelength conversion structure of the embodiment is, for example, applied to the projection device 200b of FIG. 1B. In the projection device 200b of FIG. 1B, the light source 212, for example, emits a blue light beam, and the illumination light beam IL passing through the opening 111 of the rotary disc 110 is, for example, the blue light beam, and the filter wheel 214, for example, includes a red color filter and a green color filter, so that a part of the yellow converted light beam IL' is filtered by the filter wheel 214 to form a red color light beam or a green color light beam (for example, the color light beam CL of FIG. 1B). According to the above description, it is known that in the projection device 100a of the embodiment, by using the single wavelength conversion region on the wavelength conversion material 120 in collaboration with the filter wheel 214, the effect of three color light beams of red light beam, blue light beam, and green light beam is achieved through only one phosphor/fluorescence.

In an embodiment that is not shown, the wavelength conversion material 120 aligned to the wavelength conversion region 120R1 is, for example, a fluorescent (or phosphor) layer doped with green phosphor/fluorescence, and the wavelength conversion material 120 aligned to the wavelength conversion region 120R2 is, for example, a fluorescent (or phosphor) layer doped with red phosphor/fluorescence, though the invention is not limited thereto. The wavelength conversion structure of the embodiment is, for example, applied to the projection device 200a of FIG. 1A. In this way, in the projection device 200a of FIG. 1A, the light source 212, for example, emits a blue light beam, and the illumination light beam IL passing through the opening 111 of the rotary disc 110 is, for example, the blue light beam, and a part of the illumination light beam IL respectively excite the wavelength conversion material 120 aligned to the wavelength conversion region 120R1 and the wavelength conversion material 120 aligned to the wavelength conversion region 120R2 to respectively generate a green converted light beam IL' and a red converted light beam IL'. According to the above description, it is known that in the projection device 100a of the embodiment, the effect of three color light beams of red light beam, blue light beam, and green light beam is achieved through two kinds of phosphors/fluorescence in the wavelength conversion regions on the wavelength conversion material 120 without using the filter wheel 214.

Figure 3A:
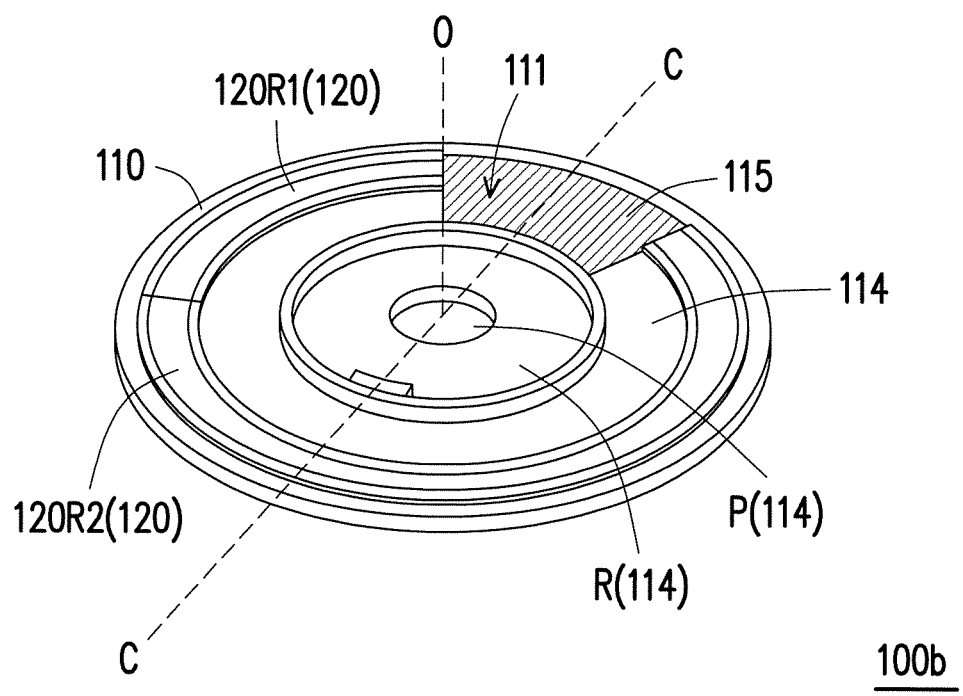
FIG. 3A is a structural diagram of a wavelength conversion structure according to another embodiment of the invention.
Figure 3B:
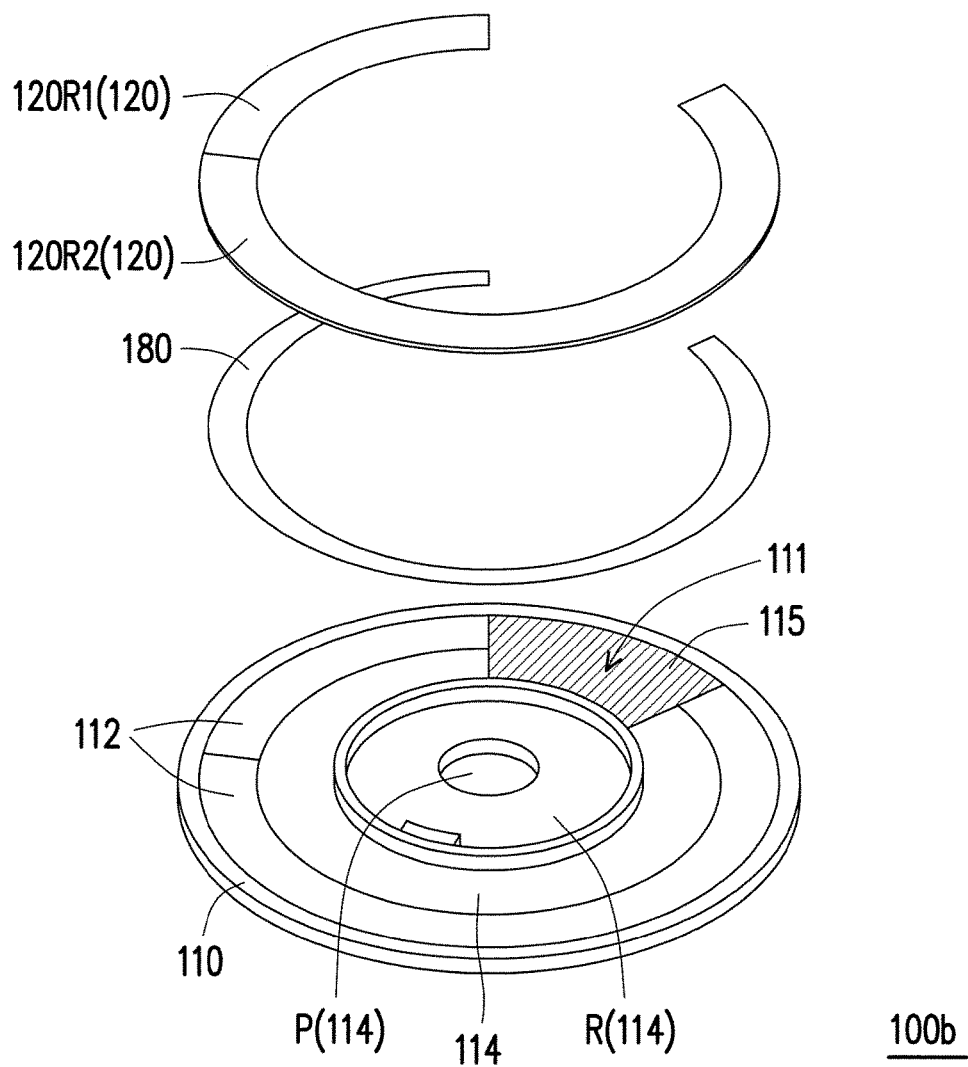
FIG. 3B is an exploded view of the wavelength conversion structure of FIG. 3A.
Figure 3C:
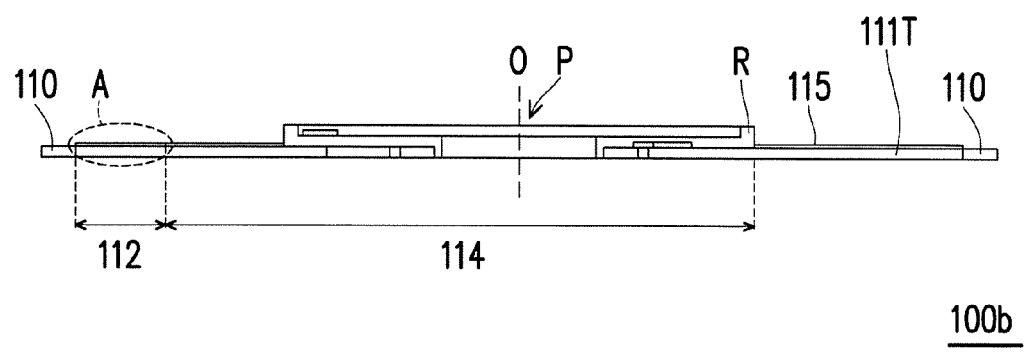
FIG. 3C is a cross-sectional view of the wavelength conversion structure of FIG. 3A along a section line C-C.
Figure 3D:
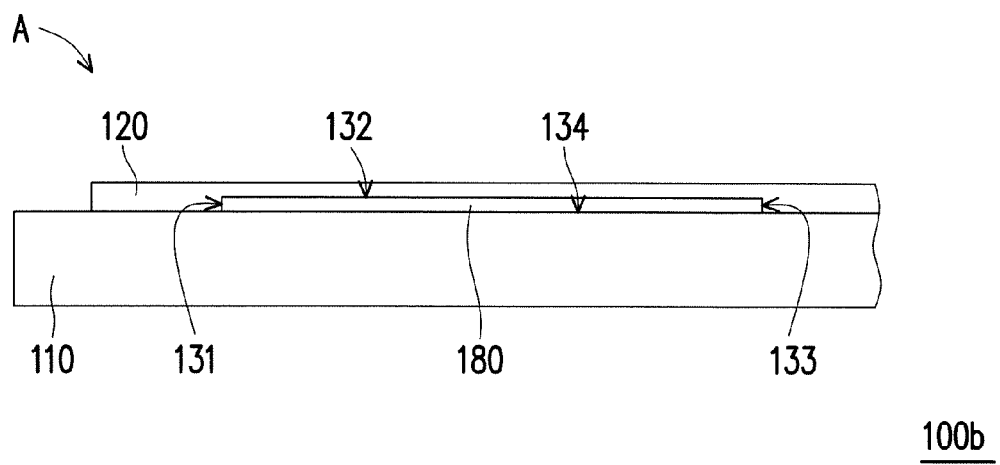
FIG. 3D is an enlarged cross-sectional view of a region A in FIG. 3C.

FIG. 3A is a structural diagram of a wavelength conversion structure according to another embodiment of the invention. FIG. 3B is an exploded view of the wavelength conversion structure of FIG. 3A. FIG. 3C is a cross-sectional view of the wavelength conversion structure of FIG. 3A along a section line C-C. FIG. 3D is an enlarged cross-sectional view of a region A in FIG. 3C.

Referring to FIG. 3A, FIG. 3B, FIG. 3C and FIG. 3D, the wavelength conversion structure 100 in the projection devices 200a and 200b of the aforementioned embodiment is, for example, the wavelength conversion structure 100b shown in FIG. 3A to FIG. 3D. The wavelength conversion structure 100b of FIG. 3A to FIG. 3D is similar to the wavelength conversion structure 100a of FIG. 2A to FIG. 2D, and a main difference therebetween is that the wavelength conversion structure 100b further includes another wavelength conversion material, the another wavelength conversion material is mixed with the scattering-reflective material to form a mixture 180, and energy gap of the another wavelength conversion material is smaller than the photon energy of the illumination light beam IL. In this way, the mixture 180 has both of a scattering-reflective function and a wavelength conversion function. Moreover, in the embodiment, the rotary disc 110 further has an anti-reflection material 115. In the embodiment, the rotary disc 110 has an opening 111, a transparent material 111T (shown in FIG. 3C) is correspondingly disposed in/at the opening 111, and a surface of the transparent material 111T facing the light source 112 and/or a surface of the transparent material 111T back-facing the light source 112 (opposite to the surface of the transparent material 111T facing the light source 112) have/has the anti-reflection material 115 (are/is configured with the anti-reflection material 115).

In the embodiment, the phosphor/fluorescence in the wavelength conversion material 120 is, for example, yellow phosphor/fluorescence, and the phosphor/fluorescence of the another wavelength conversion material is, for example, another yellow phosphor/fluorescence. A main difference between the yellow phosphor/fluorescence in the wavelength conversion material 120 and the another yellow phosphor/fluorescence in the another wavelength conversion material is that central wavelengths of the two yellow light beams emitted by the two excited yellow phosphors/fluorescence are different. In other embodiments, the another phosphor/fluorescence of the another wavelength conversion material may also be blue phosphor/fluorescence, green phosphor/fluorescence, red phosphor/fluorescence or phosphor/fluorescence of other colors, which is not limited by the invention.

On the other hand, in the embodiment, the transparent material 111T is disposed in the opening 111 of the rotary disc 110, such that the noise produced when the rotary disc 110 rotates is greatly decreased. In the embodiment, since anti-reflection material 115 is disposed on the surface of the transparent material 111T, when the illumination light beam IL is transmitted to the anti-reflection material 115, the illumination light beam IL would not be reflected almost (is hardly reflected), so as to achieve an effect of substantially completely penetrating through the anti-reflection material 115 and the transparent material 111T. In the embodiment, the transparent material 111T is, for example, glass, and the anti-reflection material 115 is, for example, an anti-reflection film.

Figure 4A:
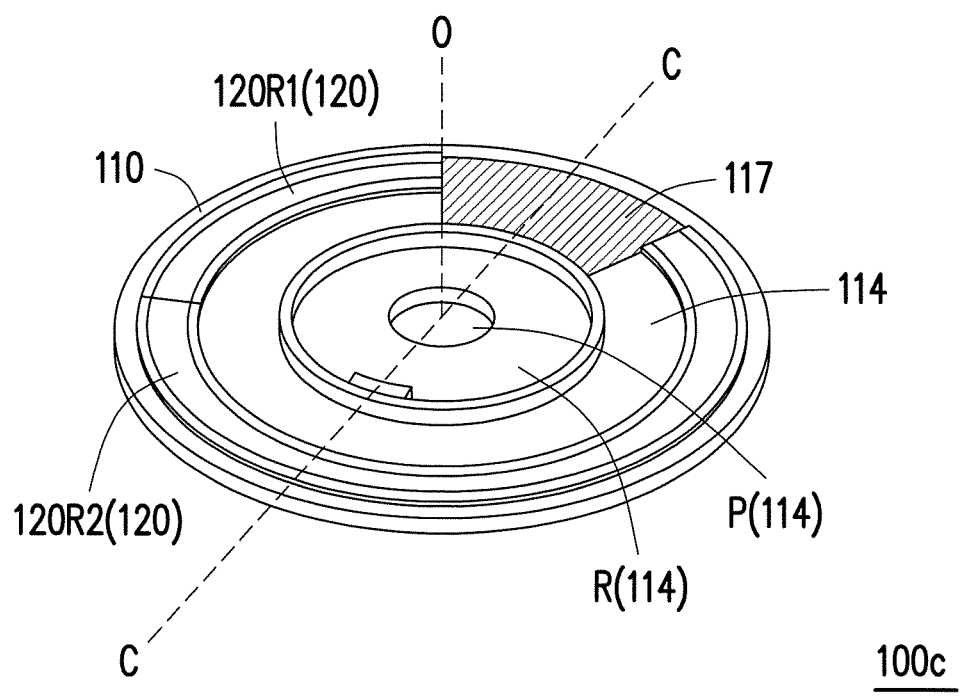
FIG. 4A is a structural diagram of a wavelength conversion structure according to still another embodiment of the invention.
Figure 4B:
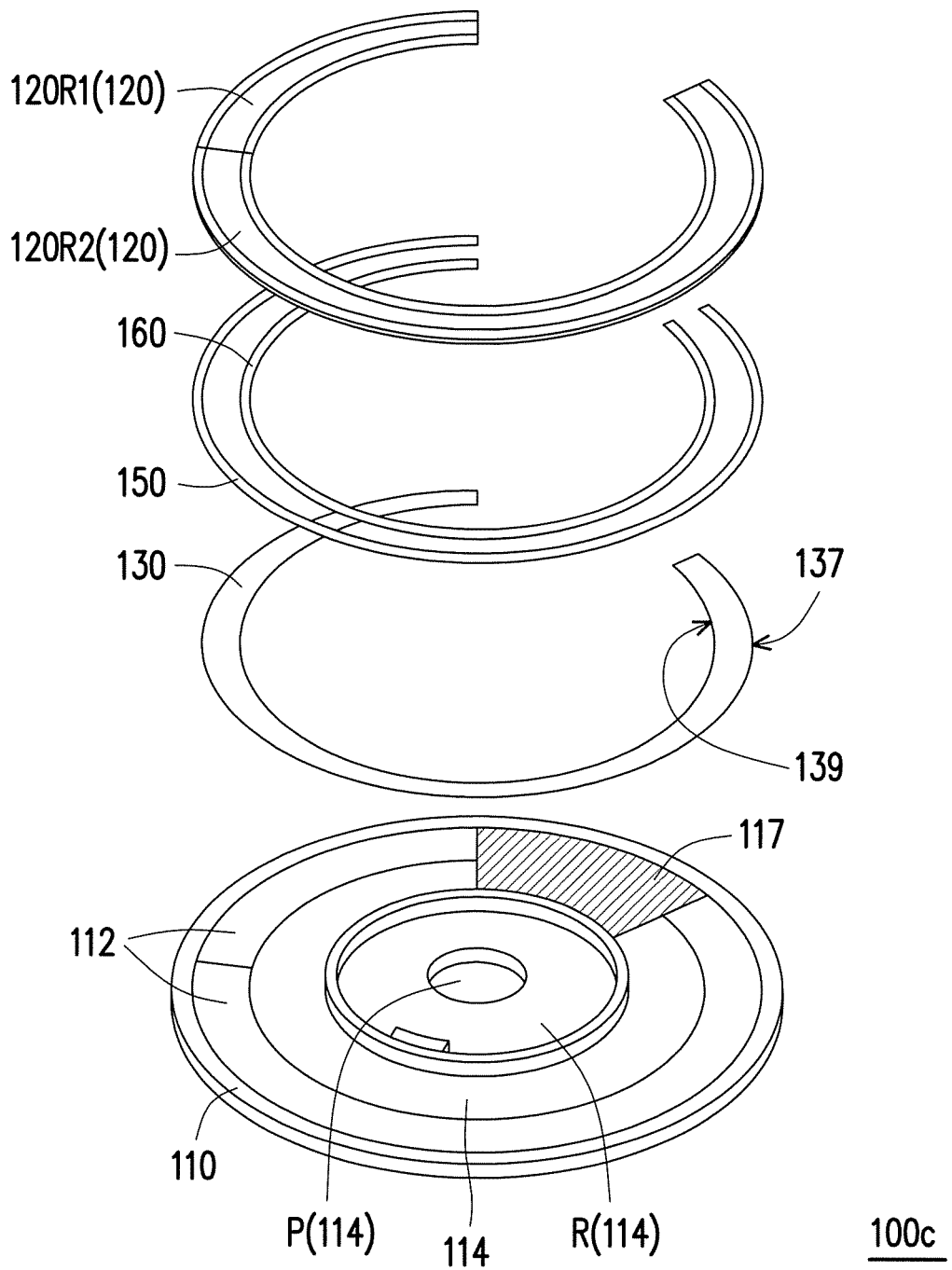
FIG. 4B is an exploded view of the wavelength conversion structure of FIG. 4A.
Figure 4C:
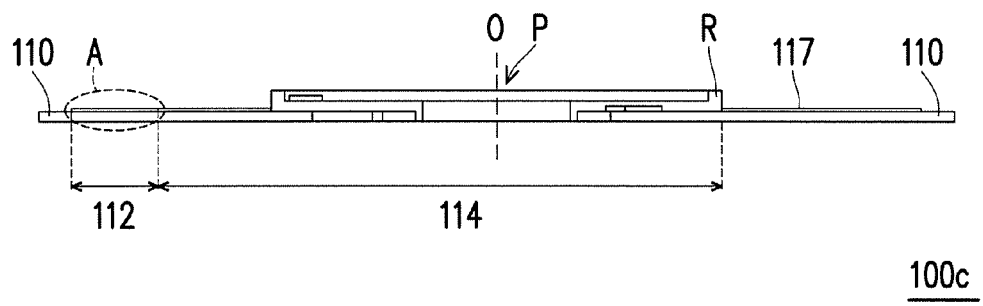
FIG. 4C is a cross-sectional view of the wavelength conversion structure of FIG. 4A along a section line C-C.
Figure 4D:
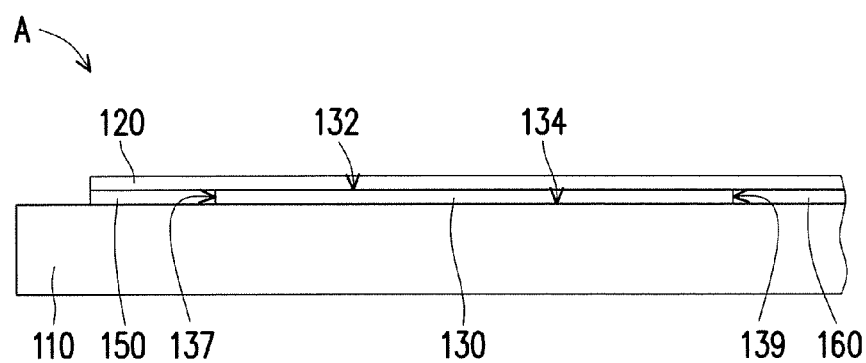
FIG. 4D is an enlarged cross-sectional view of a region A in FIG. 4C.

FIG. 4A is a structural diagram of a wavelength conversion structure according to still another embodiment of the invention. FIG. 4B is an exploded view of the wavelength conversion structure of FIG. 4A. FIG. 4C is a cross-sectional view of the wavelength conversion structure of FIG. 4A along a section line C-C. FIG. 4D is an enlarged cross-sectional view of a region A in FIG. 4C.

Referring to FIG. 4A, FIG. 4B, FIG. 4C and FIG. 4D, the wavelength conversion structure 100 in the projection devices 200a and 200b of the aforementioned embodiment is, for example, the wavelength conversion structure 100c shown in FIG. 4A to FIG. 4D. The wavelength conversion structure 100c of FIG. 4A to FIG. 4D is similar to the wavelength conversion structure 100a of FIG. 2A to FIG. 2D, and a main difference therebetween is that the wavelength conversion structure 100c further includes a first fixing structure 150 and a second fixing structure 160. In the embodiment, the first fixing structure 150 and the second fixing structure 160 are clamped/sandwiched between the wavelength conversion material 120 and the rotary disc 110, the first fixing structure 150 surrounds the non-light-conversion region 114 along an outer circumference 137 of the scattering-reflective material 130, and the second fixing structure 160 surrounds the non-light-conversion region 114 along an inner circumference 139 of the scattering-reflective material 130. According to FIG. 4D, it is known that the scattering-reflective material 130, the first fixing structure 150, and the second fixing structure 160 are located in a same layer. Namely, the scattering-reflective material 130 is clamped/sandwiched between the first fixing structure 150 and the second fixing structure 160. In overall, the scattering-reflective material 130, the first fixing structure 150, and the second fixing structure 160 are clamped/sandwiched between the wavelength conversion material 120 and the rotary disc 110. Moreover, in the embodiment, the rotary disc 110 further has a light reflection material 117, and when a part of the illumination light beam IL is transmitted to the light reflection material 117, the illumination light beam IL is reflected by the light reflection material 117. In the embodiment, the light reflection material 117 and the light-conversion region 112 together surround the non-light-conversion region 114 through the light reflection material 117 connecting to the light-conversion region 112.

Referring to FIG. 4D, in the embodiment, the first fixing structure 150 is connected to a side surface (i.e. the outer circumference) 137 of the scattering-reflective material 130, and the second fixing structure 160 is connected to a side surface (i.e. the inner circumference) 139 of the scattering-reflective material 130. The wavelength conversion material 120 is connected to the top surface 132 of the scattering-reflective material 130, the rotary disc 110 is connected to the bottom surface 134 of the scattering-reflective material 130, and the rotary disc 110 is also connected to the first fixing structure 150 and the second fixing structure 160. In other words, in the embodiment, the first fixing structure 150, the second fixing structure 160, and the wavelength conversion material 120 encapsulate the scattering-reflective material 130. In this way, the scattering-reflective material 130 is adhered to the rotary disc 110, and the first fixing structure 150 and the second fixing structure 160 provide an additional adhesion force for the scattering-reflective material 130, such that the scattering-reflective material 130 is in a stable position. Moreover, the wavelength conversion material 120 is also connected to the first fixing structure 150 and the second fixing structure 160, so that the wavelength conversion material 120 is not liable to drop/peel. In this way, the wavelength conversion material 120, the first fixing structure 150, and the second fixing structure 160 encapsulate the two side surfaces (i.e. the inner and outer circumferences) 139 and 137 of the scattering-reflective material 130, such that the scattering-reflective material 130 is encapsulated by/among the wavelength conversion material 120, the first fixing structure 150, and the second fixing structure 160, i.e. the scattering-reflective material 130 is encapsulated by the wavelength conversion material 120, the first fixing structure 150, the second fixing structure 160, and the rotary disc 110 together. Therefore, when the rotary disc 110 rotates, the first fixing structure 150 and the second fixing structure 160 may prevent splitting/dropping/peeling of the two side surfaces 131 and 133 of the scattering-reflective material 130, and may greatly decrease a drop/peeling chance/probability of the wavelength conversion material 120. Therefore, the wavelength conversion structure 100c of the embodiment has good light-emitting efficiency and reliability. Further, since the projection devices 200a and 200b of the embodiment include the aforementioned wavelength conversion structure 100c, when the wavelength conversion structure 100c rotates, the projection devices 200a and 200b of the embodiment may greatly prevent dropping or splitting of the scattering-reflective material 130 to influence performance of other components (for example, a projection lens) in the projection devices 200a and 200b, so that the projection devices 200a and 200b of the embodiment have good light-emitting efficiency and reliability, and quality of the projected image thereof is good.

According to the above description, in the embodiment, the first fixing structure 140 and the second fixing structure 150 are, for example, an OCA having a low refractive index, and the refractive index thereof is, for example, within a range between 1.3 and 1.6.

Figure 5A:
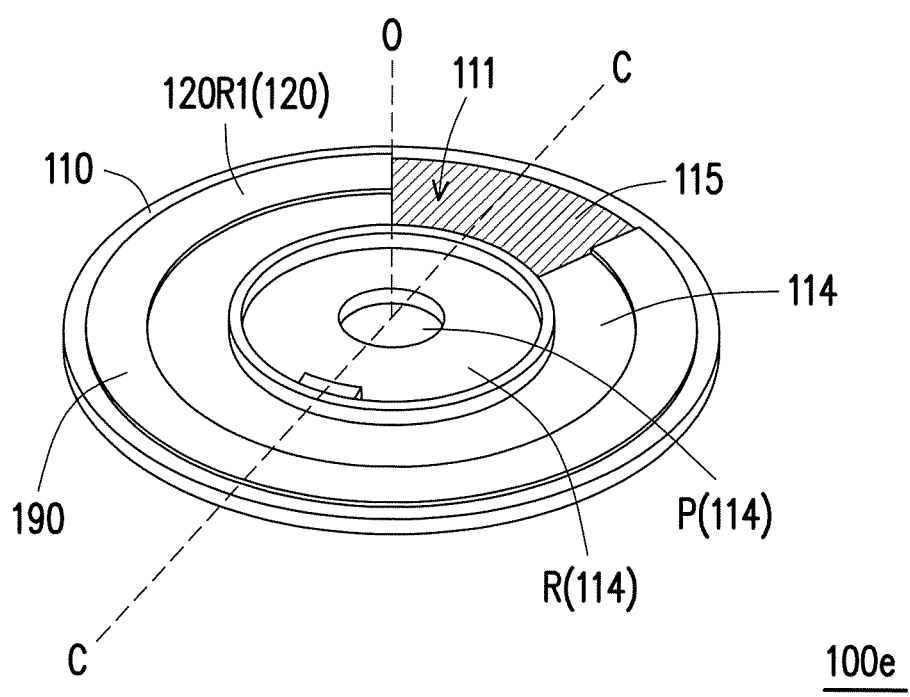
FIG. 5A is a structural diagram of a wavelength conversion structure according to yet another embodiment of the invention.
Figure 5B:
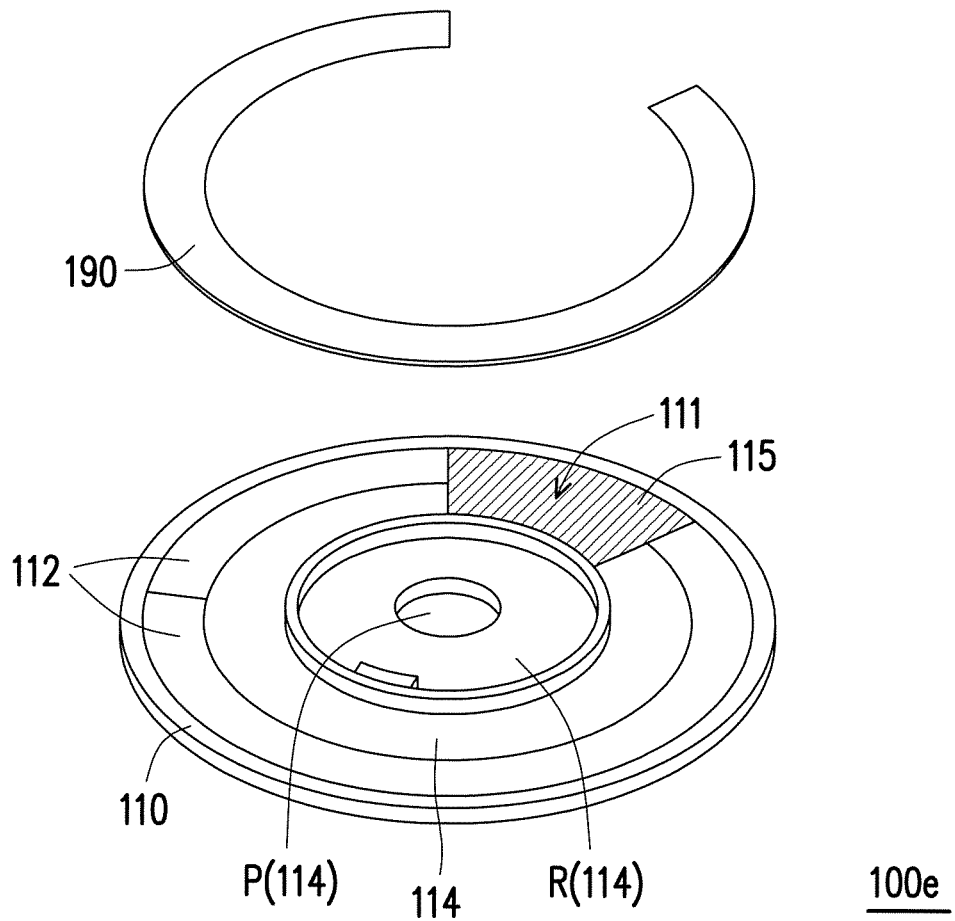
FIG. 5B is an exploded view of the wavelength conversion structure of FIG. 5A.
Figure 5C:
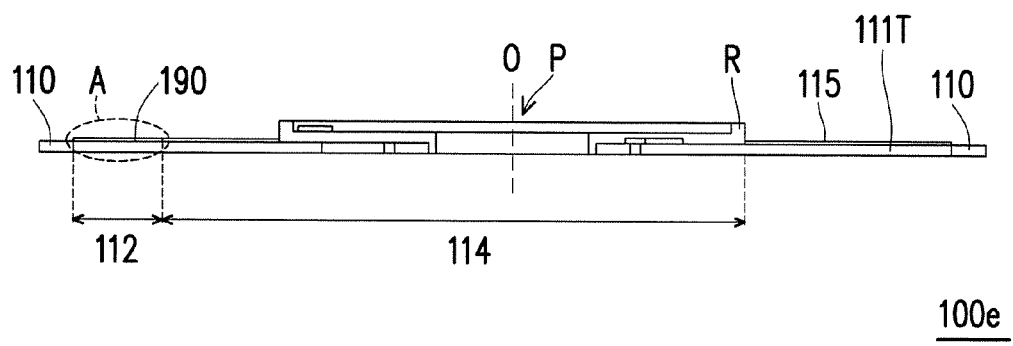
FIG. 5C is a cross-sectional view of the wavelength conversion structure of FIG. 5A along a section line C-C.
Figure 5D:
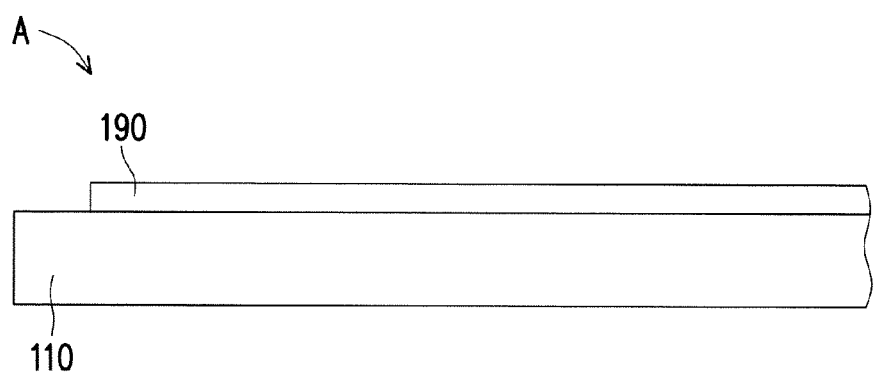
FIG. 5D is an enlarged cross-sectional view of a region A in FIG. 5C.

FIG. 5A is a structural diagram of a wavelength conversion structure according to yet another embodiment of the invention. FIG. 5B is an exploded view of the wavelength conversion structure of FIG. 5A. FIG. 5C is a cross-sectional view of the wavelength conversion structure of FIG. 5A along a section line C-C. FIG. 5D is an enlarged cross-sectional view of a region A in FIG. 5C.

Referring to FIG. 5A, FIG. 5B, FIG. 5C and FIG. 5D, the wavelength conversion structure 100 in the projection devices 200a and 200b of the aforementioned embodiment is, for example, the wavelength conversion structure 100e shown in FIG. 5A to FIG. 5D. The wavelength conversion structure 100e of FIG. 5A to FIG. 5D is similar to the wavelength conversion structure 100b of FIG. 3A to FIG. 3D, and a main difference therebetween is that the wavelength conversion material and the scattering-reflective material are mixed into a mixture 190. In this way, the mixture 190 has both of the scattering-reflective function and the wavelength conversion function, and avoids poor bonding effect between layers caused by multi-layer coating, so that the wavelength conversion structure 100e of the embodiment has good reliability. Moreover, due to a simple manufacturing process, manufacturing cost of the wavelength conversion structure 100e of the embodiment is greatly decreased. Further, since the projection devices 200a and 200b of the embodiment include the aforementioned wavelength conversion structure 100e, the projection devices 200a and 200b of the embodiment have good reliability and low manufacturing cost.

In summary, the embodiments of the invention have at least one of following advantages or effects. The wavelength conversion material and the scattering-reflective material in the wavelength conversion structure of the embodiment of the invention are all aligned to the light-conversion region, and the scattering-reflective material is not aligned to the non-light-conversion region, so that a chance/probability that the scattering-reflective material is exposed to environmental media (for example, air) is low, which greatly mitigates falling/dropping/peeling/splitting of the scattering-reflective material. Therefore, the wavelength conversion structure of the embodiment of the invention has good light-emitting efficiency and reliability. Further, since the projection device of the embodiment of the invention includes the aforementioned wavelength conversion structure, when the wavelength conversion structure rotates, the projection device of the embodiment of the invention may greatly avoid dropping/splitting/falling/peeling of the scattering-reflective material to influence other components (for example, a projection lens) in the projection device, so that the projection device of the embodiment of the invention has good light-emitting efficiency and reliability, and quality of the projected image thereof is good.

Moreover, in the wavelength conversion structure of the embodiment of the invention, the wavelength conversion material encapsulates the scattering-reflective material. On the other hand, the wavelength conversion structure of the embodiment of the invention further includes the first fixing structure and the second fixing structure, the first fixing structure surrounds the non-light-conversion region along an outer circumference of the scattering-reflective material, and the second fixing structure surrounds the non-light-conversion region along an inner circumference of the scattering-reflective material. In this way, the scattering-reflective material may adhered to the rotary disc, and the wavelength conversion material or the first fixing structure/the second fixing structure may further provide an additional adhesion force to the scattering-reflective material, such that the scattering-reflective material is in a stable position. Therefore, when the rotary disc rotates, the wavelength conversion material or the first fixing structure/the second fixing structure may prevent splitting/falling/dropping/peeling of the scattering-reflective material from two side surfaces thereof. Therefore, the light-emitting efficiency and reliability of the wavelength conversion structure and the projection device of the embodiment of the invention may be further improved.

Moreover, in the wavelength conversion structure of the embodiment of the invention, the wavelength conversion material and the scattering-reflective material may be mixed into a mixture. In this way, the mixture may have both of the scattering-reflective function and the wavelength conversion function, and avoid poor bonding effect between layers caused by multi-layer coating, so that the wavelength conversion structure of the embodiment has good reliability. Moreover, due to a simple manufacturing process, manufacturing cost of the wavelength conversion structure of the embodiment is greatly decreased. Further, since the of the embodiment projection device of the invention includes the aforementioned wavelength conversion structure, the projection device of the embodiment of the invention has good reliability and low manufacturing cost. In overall, the embodiments of the invention may mitigate/improve the thermal quenching phenomenon of the wavelength conversion structure.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection device, comprising:
an illumination system, comprising:
a light source, adapted to providing an illumination light beam; and
a wavelength conversion structure, disposed on a transmission path of the illumination light beam emitted by the light source, the wavelength conversion structure comprising:
a rotary disc, having a light-conversion region and a non-light-conversion region, wherein the light-conversion region surrounds the non-light-conversion region;
a wavelength conversion material, disposed on the rotary disc, and aligned to the light-conversion region, wherein an energy gap of the wavelength conversion material is smaller than a photon energy of the illumination light beam; and
a scattering-reflective material, disposed on the rotary disc, and aligned to the light-conversion region, and not aligned to the non-light-conversion region, wherein an energy gap of the scattering-reflective material is larger than the photon energy of the illumination light beam, the scattering-reflective material is sandwiched between the rotary disc and the wavelength conversion material, the scattering-reflective material has a top surface, and the top surface of the scattering-reflective material is connected to a bottom surface of the wavelength conversion material, wherein an area of the bottom surface of the wavelength conversion material is greater than an area of the top surface of the scattering-reflective material;
a light valve, adapted to converting a converted light beam from the wavelength conversion structure into an image light beam; and
an imaging system, disposed on a transmission path of the image light beam.

2. The projection device as claimed in claim 1, wherein the wavelength conversion material encapsulates the scattering-reflective material.

3. The projection device as claimed in claim 1, wherein the wavelength conversion structure further comprises an another wavelength conversion material, wherein the another wavelength conversion material and the scattering-reflective material are mixed into a mixture, and an energy gap of the another wavelength conversion material is smaller than the photon energy of the illumination light beam.

4. The projection device as claimed in claim 1, wherein the wavelength conversion structure further comprises:
a first fixing structure and a second fixing structure, clamped between the wavelength conversion material and the rotary disc, wherein the first fixing structure surrounds the non-light-conversion region along an outer circumference of the scattering-reflective material, and the second fixing structure surrounds the non-light-conversion region along an inner circumference of the scattering-reflective material.

5. The projection device as claimed in claim 4, wherein the scattering-reflective material, the first fixing structure, and the second fixing structure are located in a same layer.

6. The projection device as claimed in claim 1, wherein the rotary disc further has an opening, and the opening and the light-conversion region together surround the non-light-conversion region by the opening connecting to the light-conversion region.

7. The projection device as claimed in claim 1, wherein the rotary disc further has a light reflection material, and the light reflection material and the light-conversion region together surround the non-light-conversion region by the light reflection material connecting to the light-conversion region.

8. The projection device as claimed in claim 1, further comprising:
a filter wheel, disposed on a transmission path of the converted light beam from the wavelength conversion structure, wherein the light valve is adapted to convert at least one color light beam from the filter wheel into the image light beam.

9. A wavelength conversion structure, adapted to be disposed on a transmission path of an illumination light beam emitted by a light source of a projection device, the wavelength conversion structure comprising:
a rotary disc, having a light-conversion region and a non-light-conversion region, wherein the light-conversion region surrounds the non-light-conversion region;
a wavelength conversion material, disposed on the rotary disc, and aligned to the light-conversion region, wherein an energy gap of the wavelength conversion material is smaller than a photon energy of the illumination light beam; and a scattering-reflective material, disposed on the rotary disc, and aligned to the light-conversion region, and not aligned to the non-light-conversion region, wherein an energy gap of the scattering-reflective material is larger than the photon energy of the illumination light beam, the scattering-reflective material is sandwiched between the rotary disc and the wavelength conversion material, the scattering-reflective material has a top surface, and the top surface of the scattering-reflective material is connected to a bottom surface of the wavelength conversion material, wherein an area of the bottom surface of the wavelength conversion material is greater than an area of the top surface of the scattering-reflective material.

10. The wavelength conversion structure as claimed in claim 9, wherein the wavelength conversion material encapsulates the scattering-reflective material.

11. The wavelength conversion structure as claimed in claim 9, further comprising:

an another wavelength conversion material, wherein the another wavelength conversion material and the scattering-reflective material are mixed into a mixture, and an energy gap of the another wavelength conversion material is smaller than the photon energy of the illumination light beam.

12. The wavelength conversion structure as claimed in claim 9, further comprising:

a first fixing structure and a second fixing structure, clamped between the wavelength conversion material and the rotary disc, wherein the first fixing structure surrounds the non-light-conversion region along an outer circumference of the scattering-reflective material, and the second fixing structure surrounds the non-light-conversion region along an inner circumference of the scattering-reflective material.

13. The wavelength conversion structure as claimed in claim 12, wherein the scattering-reflective material, the first fixing structure, and the second fixing structure are located in a same layer.

14. The wavelength conversion structure as claimed in claim 9, wherein the rotary disc further has an opening, and the opening and the light-conversion region together surround the non-light-conversion region by the opening connecting to the light-conversion region.

15. The wavelength conversion structure as claimed in claim 9, wherein the rotary disc further has a light reflection material, and the light reflection material and the light-conversion region together surround the non-light-conversion region by the light reflection material connecting to the light-conversion region.

* * * * *